United States Patent [19]

Ehl

[11] Patent Number: 4,708,330

[45] Date of Patent: Nov. 24, 1987

[54] ALIGNMENT AND ASSEMBLY TOOL FOR VERY LARGE DIAMETER CYLINDERS

[75] Inventor: James H. Ehl, Huntsville, Ala.

[73] Assignee: The United States of America as represented by the Administrator of the National Aeronautics and Space Administration, Washington, D.C.

[21] Appl. No.: 25,039

[22] Filed: Mar. 12, 1987

Related U.S. Application Data

[63] Continuation of Ser. No. 739,788, May 31, 1985, abandoned.

[51] Int. Cl.⁴ ............................................. B25B 1/20
[52] U.S. Cl. ..................................... 269/43; 269/71; 269/73
[58] Field of Search ....................... 269/43, 71, 73, 37, 269/46, 60, 77, 152; 228/49.3

[56] References Cited

U.S. PATENT DOCUMENTS

| | | | |
|---|---|---|---|
| 1,580,627 | 4/1926 | Peterson | 269/73 |
| 1,600,835 | 9/1926 | Manley | 269/71 |
| 1,916,556 | 7/1933 | Butt | 269/43 |
| 3,467,295 | 9/1969 | Watson | 228/49 |
| 3,578,233 | 5/1971 | Meister | 269/58 |
| 3,619,891 | 11/1971 | Harrison | 29/272 |
| 3,666,159 | 5/1972 | Watson | 228/49 |
| 3,722,038 | 3/1973 | Arntz et al. | 24/81 PE |
| 3,837,060 | 9/1974 | Stehling | 269/71 |
| 3,898,714 | 8/1975 | McFadden | 269/43 |
| 3,952,936 | 4/1976 | Dearman | 228/49 |
| 4,054,984 | 10/1977 | Ball et al. | 269/43 |
| 4,195,828 | 4/1980 | Peterson | 269/43 |
| 4,356,615 | 11/1982 | Dearman | 29/525 |

*Primary Examiner*—Frederick R. Schmidt
*Assistant Examiner*—Judy J. Hartman
*Attorney, Agent, or Firm*—Joseph H. Beumer; John R. Manning; Leon D. Wofford, Jr.

[57] ABSTRACT

An alignment and assembly tool 10 is disclosed for aligning the ends of two very large cylinders 36 and 38 so that the ends may be welded together, with a cylindrical strengthening section (tee ring) 18 inserted between the cylinders and aligned and welded into the joint. The tool 10 has a U-shaped main body 11 with a horizontal top section 13 and two legs 15, which are attached to the ends of top section 13 and extend outward and downward. Horizontal bottom sections 12 extend outward from the bottoms 14 of legs 15. Tool 10 has one inner jackscrew 20 and one outer jackscrew 22 on each side of its center, extending downward from top section 13. Each of the two bottom sections 12 has an attached side clamp 24 for clamping the alignment tool 10 to two opposing skin stringers 26 of cylinders 36 and 38. The jackscrews 20 and 22 are adjusted to bring the edges of tee ring 18 into precise alignment with the ends of the two large cylinders 36 and 38 so that both joints 51 and 53 may be welded around their full circumference.

13 Claims, 4 Drawing Figures

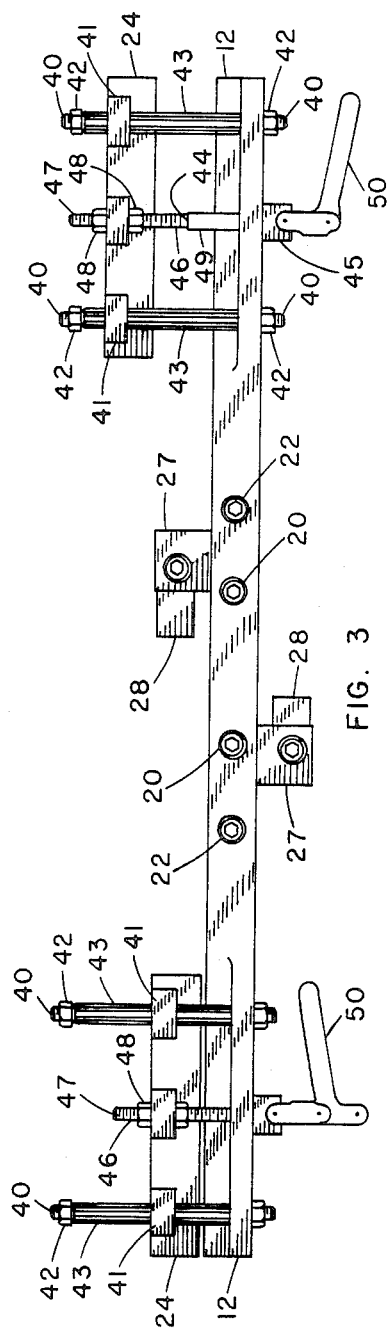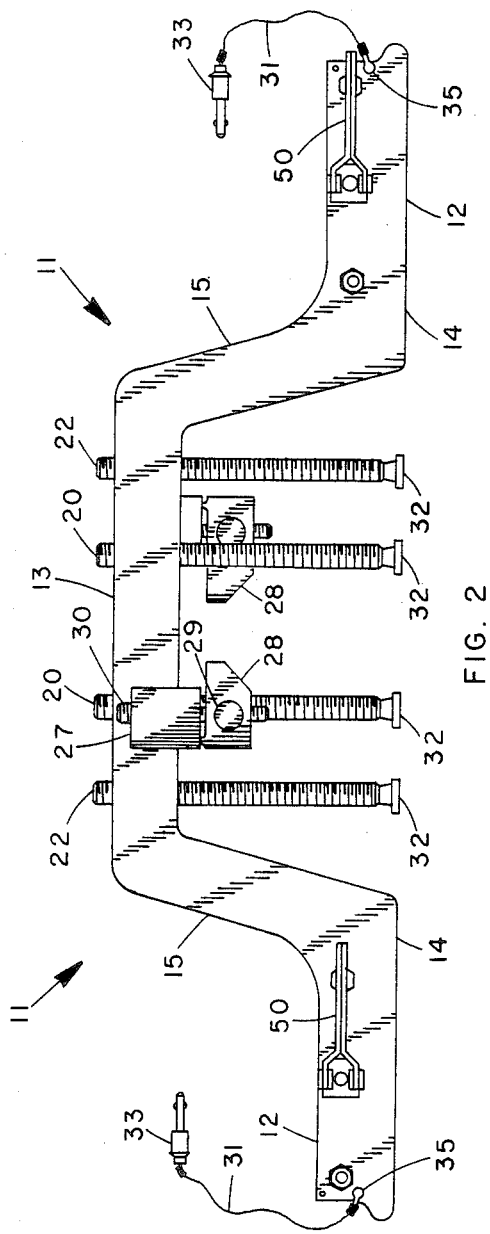

ALIGNMENT AND ASSEMBLY TOOL FOR VERY LARGE DIAMETER CYLINDERS

ORIGIN OF THE INVENTION

The invention described herein was made by an employee of the United States Government and may be manufactured and used by or for the Government of the United States of America for Governmental purposes without the payment of any royalties thereon or therefore.

This application is a continuation of application Ser. No. 739,788, filed May 31, 1985, now abandoned.

TECHNICAL FIELD

The present invention relates generally to alignment tools and more particularly to a tool used to accurately align and hold very large diameter cylinders together for weld assembly.

BACKGROUND OF THE INVENTION

For a number of years, the National Aeronautics and Space Administration has had a monumental task in aligning the joints of very large cylinders so that they can be welded together for the purpose of assembling fuel tanks for space vehicles. One such application occurs in assembling the external tank for the space shuttle, an application which requires welding together two very large cylinders about 27 feet in diameter, which are butted together end-to-end. In this case the problem is accentuated by the fact that the joint must be strengthened by inserting a strengthening section or tee ring between the mating ends of the two large cylinders. The tee-ring, which adds strength to the joint because it has a cross section somewhat like an I-beam, has two lower flanges which have the same diameter and thus mate with the ends of the two large cylinders.

In the past a large mandrel-type assembly tool has been used to hold the cylinder assemblies in position for the welding operation. However, mandrel tooling is expensive and cumbersome to use. Mandrels do not offer the very precise mating ability that is needed in this application. Therefore, the National Aeronautics and Space Administration has had a continuing need for a better way to precisely align and hold these large diameter cylinders in position for welding. Obviously, in the manufacture of space vehicles, greater accuracy, precision, and strength are required than in other, more routine manufacturing applications involving the assembly of much smaller cylinders.

The prior art discloses a number of devices for temporarily aligning the ends of cylindrical pipes in order to weld them together. One such device is disclosed in U.S. Pat. No. 3,952,936 to DEARMAN. The DEARMAN patent discloses a pair of metal bands which form an annulus adapted to encircle one of the pipe sections. The two metal bands are joined together by metal web members spaced circumferentially around the annulus. The web members extend outward at a right angle to the metal bands above the surface of the second pipe sectin. The end of each web member is equipped with a force supplying screw to conform the configuration of the first pipe section to that of the second. Each web member has a flange through which extends a threaded adjusting screw that is adapted to engage the outer surface of the second pipe. This DEARMAN device, while it appears to be an effective device for conforming one pipe section to the end of a second pipe section, would not be an effective way to join two very large cylinders which have a reinforcing section between the ends of the cylinders.

A second patent to DEARMAN, U.S. Pat. No. 4,356,615 shows a device for aligning two large pipes for welding. This device has two substantially coaxial annular clamps for encircling the two mating pipe sections. This device is operative to put pressure on the outside of one pipe to bring the circumference into a certain configuration. Pressure is then executed against the outside circumference of the second pipe to bring it in to a similar configuration. Finally the two sections are pulled toward each other to bring them into final position for welding. This invention contains means to affect rocking and axial movements and shifting means to affect transverse movements of the two large clamps. Thus the structure of this device appears to be complicated and expensive and would be too elaborate to upsize for mating cylinders having a diameter of about 27 feet.

Another prior art device is disclosed in U.S. Pat. No. 3,467,295 to WATSON. WATSON discloses another device for securing pipe sections in proper alignment to facilitate welding them. The WATSON device has an annular metal band having a compression clamp which is used to force the ends of the annular member toward one another. The annular member fits around one pipe section near its end. A series of clamping arms are spaced circumferentially around the annular metal band. One end of the clamping arms is secured to the metal band and the other end of the clamping arm extends parallel to the pipe assembly access over the second section of pipe. The ends of the clamping arm contain threaded bolts with pointed ends which may be selectively engaged upon the second pipe section to allow proper pipe alignment. This device is really only suitable for the purpose of aligning small circumference pipes. Moreover, it will only conform one pipe section to the circumference of the other pipe section, but will not adjust the two pipe sections relative to each other. This device could not be upsized to align very large diameter cylinders.

A second patent to WATSON, U.S. Pat. No. 3,666,159, which is a continuation-in-part of the earlier WATSON patent discloses similar structure except that a link chain is used instead of an annular metal band. This device, like the earlier WATSON device, could not be upsized to align very large diameter cylinders.

The prior art includes several other pipe clamping devices which have chains extending around the circumference of a pipe to position jacks or shoes which configure the end of one pipe in order to make it mate with the end of another pipe for welding. These devices are all designed for use in welding the ends of small pipes together and could not be upsized so as to be suitable for assembling very large cylinders.

U.S. Pat. No. 4,195,828 to PETERSON discloses a boiler tube welding clamp which fits around the end of one tube and has a jack screw which puts pressure on the end of a second tube and brings it into alignment with the end of the first tube. Again, this device is designed for use with comparatively small tubes and would not be at all suitable for use in aligning the ends of very large cylinder of the order to twenty-seven feet in diameter.

U.S. Pat. No. 3,619,891 to Harrison discloses an aligning pipe clamp which will allow abutting pipe ends to be welded together. The clamp consists of a plurality of spaced aligning block members, each having an adjustable screw and contact foot. Each of the blocks receives a roller chain which is held in place by means of a ratchet so that the blocks may slide along the external surface of the pipes.

U.S. Pat. No. 3,722,038 to ARNTZ et al. discloses a device for holding pipe sections together for welding comprising pipe clamping shoes held in place by chains extending around the outside of the pipe sections. Each shoe contains threaded pipe-positioning members which can be radially adjusted to engge one of the pipe sections.

U.S. Pat. No. 1,916,556 to BUTT discloses a clamp which may be used with an elongated clamping bar, having an angular cross section, to bind together two lengths of metal pipe before welding. The clamp includes a jaw, engageable by means of a screw, and a ligature, adapted to be wrapaped araound teh pipe and clamping bar.

A primary object of this invention is to provide an alignment tool which is capable of aligning very large cylinders which are butted together end-to-end so that the joint may be welded.

Another object of this invention is to provide an alignment tool which may be installed on the inside surfaces of very large cylinders to align them so that they may be welded together end-to-end.

Still another object of this invention is to provide an alignment tool which is capable of aligning two very large cylinders which are butted together end-to-end, when a cylindrical stengthening section (tee ring) having an up-right, generally I-beam shaped cross section is positioned between the two ends of the very large cylinders.

A fourth object of this invention is to provide an alignment tool for very large cylinders which is capable of aligning two large cylinders butted together end-to-end for welding and which is capable of achieving more precise mating abililty than is possible through the use of mandrel tooling previously used for this purpose.

A fifth object of this invention is the achievement of substantial cost savings over the use of expensive mandrel tooling previously used to align two very large cylinders for the purpose of welding their end sections together.

SUMMARY OF THE INVENTION

The invention is an alignment and assembly tool for aligning and holding two very large cylinders together end-to-end for the purpose of welding them together, with a cylindrical strengthening section inserted between the ends of the very large cylinders. The invention comprises: an inverted U-shaped main body comprising: a horizontal top section, two legs attached to the ends of said top section and extending downward and tilted slightly outward at an obtuse angle from the ends of said top section, and two horizontal bottom sections, each said bottom section being attached to the ends of one of said legs and extending outward horizontally; clamping means attached to each of said two bottom sections, for attaching one of said bottom sections to each of said two very large cylinders; and jackscrew means attached to said top section for aligning each of the ends of said strengthening section with one end of one of said two very large cylinders.

BRIEF DESCRIPTION OF THE DRAWINGS

FIG. 2 is a side view of the alignment tool.

FIG. 3 is a plan view of the alignment tool shown in FIG. 2.

DETAILED DESCRIPTION OF THE INVENTION

Figure 1:
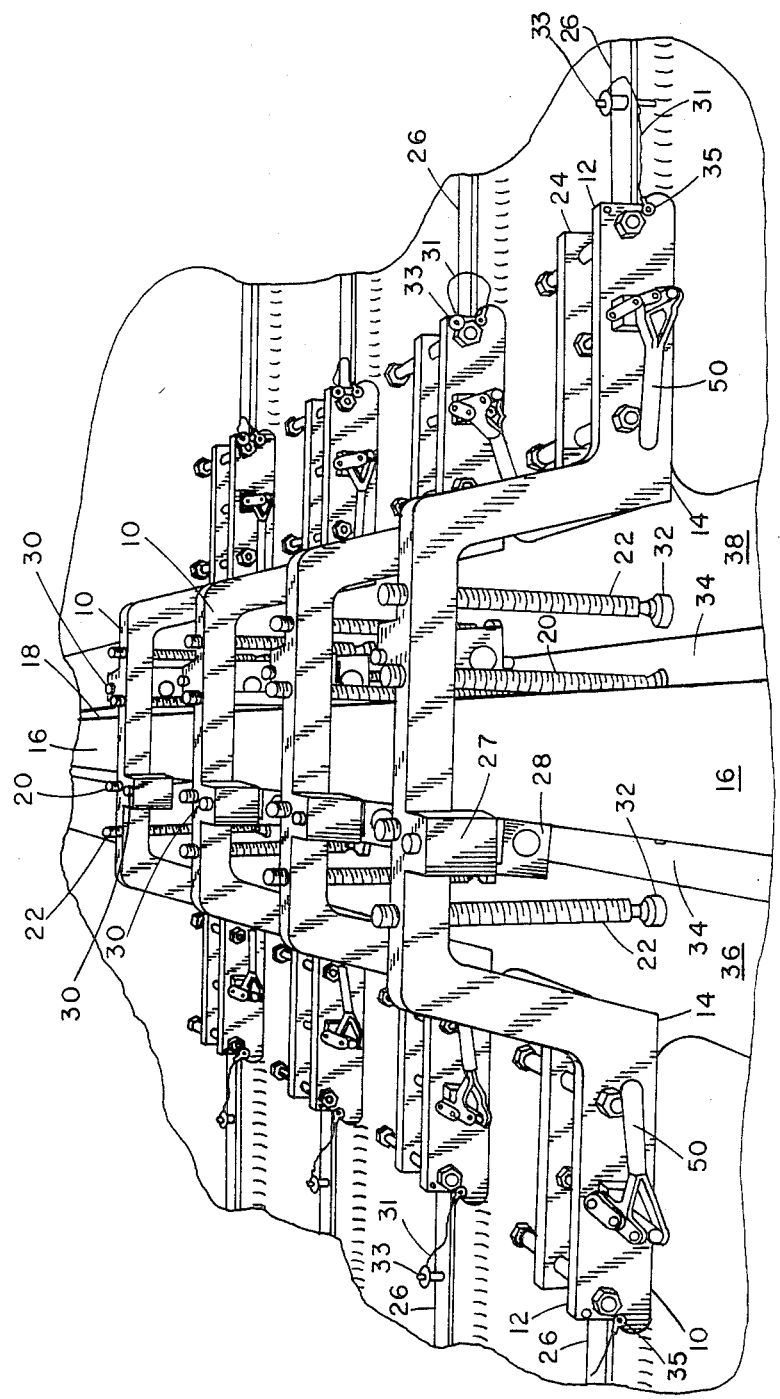
FIG. 1 is a perspective view showing how a plurality of the alignment tools are used to align two very large diameter cylinders for welding, with a small portion of the circumference of the aligned cylinders being shown.

Referring now to FIG. 1, one may see how a plurality of the alignment tools 10 are used to align two very large diameter cylinders, such as the large, 27-foot diameter cylinder used to fabricate the external tank on the Space Shuttle, the reusable space vehicle currently in use by the National Aeronautics and Space Administration. The alignment tool 10 has an inverted U-shaped main body 11 with two additional horizontal bottom sections 12, one on either side, extending outward from each of the bottoms 14 of the inverted U. The devcie is specifically designed to bridge the top (inside circumference) 16 of the tee ring 18. Each alignment tool 10 is equipped with two inner jackscrews 20 and two outer jackscrews 22. Each of the two horizontal bottom sections 12 of each alignment tool 10 has an attached side clamp 24 for clamping the alignment tool 10 to two opposing internal skin stringers 26, which are spaced strengthening ribs attached to the inside circumference of both of the two very large diameter cylinders 36 and 38. An offset block 27 is welded to each side of each alignment tool 10. One pivoting clamp (dog) 28 for clamping tool 10 to the underside of the top 16 of tee ring 18 is attached to each block 27 by use of one screw (threaded stud) 30, which is attached to pivot rod 29. Threaded stud 30 extends through tapped holes in both the offset block 27 and the pivot rod 29. Clamp (dog) 28 is mounted on and pivots to a limited degree about rod 29. As may be seen best in FIG. 4, when stud 30 is turned, dog 28 is pulled upward. Because of a raised pivot point on the top surface of dog 28, this causes one side of dog 28 (the pivot point side) to be pushed downward and the opposite side of dog 28 (the tapered side) to be pushed upward, where it makes firm contact with the underside of the top 16 of tee ring 18 and thus clamps alignment tool 10 to tee ring 18.

Looking now at FIG. 2, alignment tool 10 is seen in side view. Tool 10 has a U-shaped main body 11 and a horizontal top section 13. Two legs 15 are attached to the ends of top section 13 and extend downward and are tilted outward at an obtuse angle from the ends of to section 13. Horizontal bottom sections 12 extend outward from the bottoms 14 of legs 15 (or from the bottoms 14 of the main body). Inner jackscrews 20 are positioned near the center of tool 10 so that their footpads 32 rest on the lower flanges 34 of tee ring 18, as may be seen best in FIGS. 1 and 4. Outer jackscrews 22 are positioned so that their footpads 32 rest on the inner surface of the end sections of opposing aligned cylinders 36 and 38, as may also be seen in FIGS. 1 and 4.

In the plan view of FIG. 3, side clamps 24, which are attached to each bottom secion 12 of alignment tools 10, may be seen clearly. Clamps 24, which are for the purpose of attaching tools 10 to the skin stringers 26, are attached to bottom sections 12 by use of two studs 40 with nuts 42 and one DE-STA-CO ® type toggle clamp 45 having a stud 47 with threaded section 46 and smooth telescoping section 49, retaining nuts 48 and pivoting handle 50. Smooth section 49, which is slightly larger in diameter than threaded section 46, has a shoulder 44 at the point where smooth section 49 joins threaded section 46. The DE-STA-CO ® clamps 45 are commercially available from Southern Industries Supply Company in Birmingham, Ala. Bolts 42 have a smooth central portion 43 which passes through holes in offset blocks 41, which are attached to clamps 24.

The clamp 24 located on the right side of FIG. 3 is open. Clamps 24 may be closed (see clamp 24 located on the left side of FIG. 3) by pivoting handle 50 closer to bottom section 12. This causes telescoping section 49 to retract into the stationary main body of toggle clamp 45 and thus brings clamp 24 closer to bottom section 12. As clamp 24 closes, offset blocks 41 slide along the smooth central portion 43 of bolts 40.

Each alignment and assembly tool 10 has a safety wire 31 attached on one end to an attachment point 31 on each of its bottom sections 12. The other end of each wire 31 is attached to a post 33 on one internal skin stringer 26. Thus, the alignment tool 10 is prevented from falling, if it should not be properly installed. Actually, this is only a remote possibility since the tools 10 inherently must be properly installed in order to align properly. The safety wires 31 and the DE-STA-CO ® clamps 45 provide double assurance that the alignment and assembly tools 10 will not become disengaged and fall from their installed position.

Figure 4:
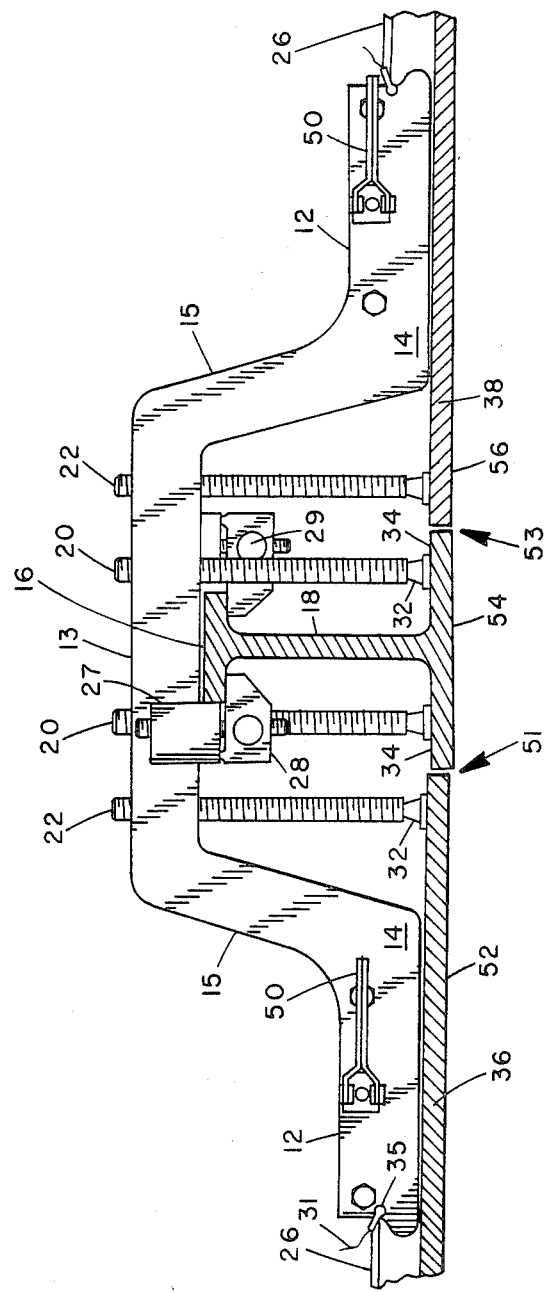
FIG. 4 is a side view of the alignment tool of FIG. 2, shown installed in position to align the mating ends of two very large cylinders, with a reinforcing section (tee ring) installed between the two mating cylinder ends.

FIG. 4 shows an enlarged side view of the alignment tool 10 installed in position to align the two mating ends of very large cylinders 36 and 38, with tee ring 18 in position between the ends of cylinders 36 and 38. FIG. 4 ha been drawn to illustrate specific mismatches 51 and 53 between the outer skin 52 of cylinder 36 and the outer skin 54 of the tee ring 18 and also between the outer skin 56 of the cylinder 38 and the outer skin 54 of tee ring 18. When installed, alignment tool 10 has its two bottom sections 12 each attached to opposing internal skin stringers 26. Two clamps 28 also hold tool 10 firmly attached to the underside of the top 16 of tee ring 18. As may be seen, the mismatched joints 51 and 53 between the outer skin 54 of tee ring 18 and the outer skin 52 of cylinder 36 and the outer skin 56 of cylinder 38, respectively, may be adjusted flush by appropriate adjustments of each inner jackscrew 20 and its corresponding outer jackscrew 22.

To operate the alignment and assembly tool 10, the two very large cylinders 36 and 38 and tee ring 18 must first be positioned and generally aligned as follows: Cylinders 36 and 38 are brought into position end-to-end so that their mating ends are not touching, leaving just enough space between them that tee ring 18 may be brought into position between their mating ends. Tee ring 18 is then moved into position between the mating ends of cylinders 36 and 38, with the ends of tee ring 18 aligned as closely as possible with the mating ends of cylinders 36 and 38.

With cylinders 36 and 38 now in general alignment end-to-end and with tee ring 18 between them and in general alignment with them, a plurality of alignment and assembly tools 10 are now installed in position to effect their precise alignment, with the top section 13 of each tool 10 bridging the tee ring 18, as shown in FIG. 4. Clamps 24 at either end of each tool 10 are closed so that they grip the upright portion of internal stringers 26, which are also aligned end-to-end so that each stringer 26 on cylinder 36 is aligned with a corresponding stringer 26 on cylinder 38. The attachment of clamps 24 to stringers 26 is accomplished by pivoting handles 50 of DE-STA-CO ® clamps 44 so that handles 50 move closer to the adjacent bottom section 12. This causes each clamp 24 to move inward and firmly grasp stringer 26 between clamp 24 and the adjacent bottom section 12. The two clamps 28 are now adjusted and tightened so that they hold tool 10 firmly attached to the undersides of both sides of the top 16 of tee ring 18. Two safety wires 31 are then fastened to attachment point 35 on each of the horizontal sections 12 and run to is corresponding attachment post 33. Next, the outer surface (skin) 54 of tee ring 18 is brought into alignment with skin 52 of cylinder 36 at point 51 and skin 56 of cylinder 38 at point 53, respectively, by relative adjustments of corresponding inner jackscrews 20 and outer jackscrews 22. Lastly, both the joints between the ends of tee ring 18 and the corresponding mating ends of cylinders 36 and 38 (at 51 and 53, respectively) are welded around the full circumference of tee ring 18.

From the above, it may be seen that the present invention solves problem several orders of magnitude larger than the problems addressed by the prior art devices. This invention makes it possible to easily align and hold together end-to-end two very large cylinders of the order of 27 feet (8.23 meters) in diameter, so they may be welded together, with a strengthening section mounted between the mating ends of the cylinders. Unlike the prior art devices, this invention is designed to be used more conveniently inside the cylinders. Moreover, this invention performs its alignment function more precisely and is much less expensive to use than the mandrel-type tooling previously used by the National Aeronautics and Space Administration.

The present invention has been specifically described for purposes of illustration as being used to assemble the external tank on the Space Shuttle. However in addition to its use for rockets or aerospace vehicles, it is obvious that the invention also finds utility in the assembly of large tanks used for various commercial purposes.

I claim:

1. An alignment and assembly tool for attachment to an interior of two very large diameter cylinders for precisely aligning and holding together said two very large diameter cylinders, said cylinders being aligned end-to-end and spaced far enough apart to accommodate a cylindrical strengthening section inserted between the near ends of said cylinders, said strengthening section having a cross-sectional area which is generally I-shaped and having two upper and two lower flanges, said cylinders and said strengthening section all being equal in diameter, said cylinders and said strengthening section being arranged and positioned so that ends of said cylindrical strengthening section touch said near ends of said two aligned large diameter cylinders, for welding said strengthening section to both said near ends of said two cylinders, said alignment tool comprising:

an inverted U-shaped main body comprising:
a horizontal top section having two ends,
two legs, each leg being attached to one of said ends of said top section, each leg extending downward and having an upper and lower end, and two horizontal bottom sections, each said horizontal bottom section having two sides and each being attached to a respective said lower end of one of said legs and extending outward horizontally;

clamping means attached to said each of two horizontal bottom sections, said clamping means being a clamp jaw laterally movable against one of said sides of each of said two horizontal bottom sections, whereby a portion of said cylinders is clamped beween each said clamp jaw and its respective horizontal section; and jackscrew means attached to said main body, aligning each of said end of said srengthening section with said near ends of said two very large diameter cylinders;

whereby said strengthening section may be welded to both of said near ends of said two very large diameter cylinders, thus attaching said two very large diameter cylinders together, aligned end-to-end with a strengthened joint.

2. The alignment and assembly tool as set forth in claim 1 wherein said two legs extend downward and are tilted slightly outward at an obtuse angle from said ends of said top section.

3. The alignment and assembly tool of claim 1 wherein each said clamp is activated by a second clamp.

4. The alignment and assembly tool of claim 3 wherein each of said two large diameter cylinders comprises a plurality of attached longitudinal internal stringers, said stringers on said two aligned cylinders being opposed and aligned end-to-end, and wherein each said second clamp is a toggle clamp for quickly attaching each of said two clamp jaws to one said opposed internal stringer attached to one of said very large diameter cylinders.

5. The alignment and assembly tool of claim 4 wherein said jackscrew means are attached to said top section.

6. The alignment and assembly tool as set forth in claim 5 wherein said jackscrew means comprise two inner jackscrews and two outer jackscrews, each said jackscrew being substantially vertical and having an upper end and a lower end.

7. The alignment and assembly tool as set forth in claim 6 wherein each of said jackscrews comprise a footpad attached to its lower end.

8. The alignment and assembly tool as set forth in claim 7 wherein one inner jackscew and one said outer jackscrew are positioned on each side of the center of said top section.

9. The alignment and assembly tool of set forth in claim 8 wherein said inner jackscrews are positioned so that said footpads of said inner jackscrews can exert pressure against the inner side of said strengthening section.

10. The alignment and assembly tool as set forth in claim 9 wherein said outer jackscrews are positioned so that each said footpad of each said outer jackscrews can exert pressure against the inner side of said near end of one of said two very large diameter cylinders.

11. The alignment and assembly tool as set forth in claim 10 comprising third clamp means for attaching said alignment tool to said strengthening section and means for attaching said third clamp means to said top section, said third clamp means being attached to said means for attaching said third clamp means to said top section.

12. The alignment and assembly tool as set forth in claim 11 wherein said means for attaching said third clamp means to said top section comprises:

a plurality of offset blocks attached to said top section;

threaded stud means attached to each of said offset blocks; and pivot means attached to each of said threaded stud means.

13. The alignment and assembly tool as set forth in claim 12 wherein said means for attaching said third clamp means to said top section comprises two offset blocks spaced longitudinally along said top section and positioned on said top section equidistant from the center of said top section, said two offset blocks being positioned on an attached to opposite sides of said top section.

* * * * *